United States Patent
Wang

(10) Patent No.: US 9,395,793 B2
(45) Date of Patent: Jul. 19, 2016

(54) ELECTRONIC DEVICE AND METHOD FOR RESUMING FROM HIBERNATION FOR THE SAME

(71) Applicant: GETAC TECHNOLOGY CORPORATION, Hsinchu County (TW)

(72) Inventor: Chen-Ping Wang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 199 days.

(21) Appl. No.: 14/170,548

(22) Filed: Jan. 31, 2014

(65) Prior Publication Data

US 2014/0317429 A1    Oct. 23, 2014

(30) Foreign Application Priority Data

Apr. 23, 2013  (CN) .......................... 2013 1 0141961

(51) Int. Cl.
*G06F 1/32*   (2006.01)
*G06F 1/16*   (2006.01)

(52) U.S. Cl.
CPC ............ *G06F 1/3231* (2013.01); *G06F 1/1694* (2013.01); *G06F 2200/1637* (2013.01)

(58) Field of Classification Search
CPC ............... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | |
|---|---|---|---|
| 8,239,840 B1 * | 8/2012 | Czymontek | G06F 8/34 717/125 |
| 8,352,903 B1 * | 1/2013 | Friedman | G06F 8/30 717/100 |
| 2007/0195074 A1 * | 8/2007 | Gelissen | G06F 1/3228 345/204 |
| 2011/0264928 A1 * | 10/2011 | Hinckley | G06F 1/1626 713/300 |
| 2011/0273378 A1 * | 11/2011 | Alameh | H04M 1/72569 345/173 |
| 2015/0234666 A1 * | 8/2015 | Iyigun | G06F 9/442 713/2 |

* cited by examiner

*Primary Examiner* — Thomas Lee
*Assistant Examiner* — Mohammad A Rahman

(57) ABSTRACT

An electronic device and method for resuming from hibernation, the electronic device has a light sensing component and a tilt sensing component. When the electronic device is in the hibernation status, external light of electronic device is detected via the light sensing component for attaining light source data, the tilt angle of the electronic device against the horizontal plane is detected via the tilt sensing component for attaining tilt data. Thus, when it is determined that the light source data and the tilt data satisfy a predetermined resuming condition, the electronic device resumes from the hibernation status. With the present invention, when a user is going to operate electronic device, and the user only needs to hold electronic device and the electronic device resumes from the hibernation status and is ready to use without extra trigger actions required.

15 Claims, 14 Drawing Sheets

ELECTRONIC DEVICE AND METHOD FOR RESUMING FROM HIBERNATION FOR THE SAME

BACKGROUND OF THE INVENTION

1. Field of the Invention

The present invention is related to an electronic device, in particular relates to electronic device and method for resuming from hibernation which is convenient to users to resume the electronic device from hibernation status.

2. Description of Related Art

Recently, as the hardware efficiency of electronic devices is growing, the performance and functions are more powerful. Accordingly, the power consumption is higher. As a result, the current electronic devices, for example, a tablet or a smart phone etc., provide a hibernation mode for power saving. When the electronic device is not in use, the electronic device enters into a hibernation mode for saving power.

FIG. 1 is a schematic diagram of the electronic device in hibernation status according to related art and FIG. 2 is a schematic diagram of the electronic device resuming from hibernation according to related art. When an electronic device 1 enters into the above mentioned hibernation mode, a screen 11 of the electronic device 1 is turned off, and the power consumption of other components (for example processor or network modules) is reduced, and the power consumption of entire electronic device is lower. When a user 2 desires to operate the electronic device 1, the user presses any key 12 of the electronic device 1 to inform the electronic device 1 that the user 2 is going to execute operation. Meanwhile, the electronic device 1 resumes form the hibernation mode. As shown in FIG. 2, the screen 11 is turned on for displaying information of the electronic device 1. When the electronic device 1 resumes, the user 2 unlocks the electronic device 1 via means of different kinds of inputs like sliding unlock or inputting password and then executes operations.

When the user 2 wants to use the electronic device 1, the user 2 has to hold the electronic device 1, presses the keys 12 in order to wake up the electronic device 1 and then executes unlock gestures to use electronic device 1. In other words, the user 2 cannot use the electronic device 1 immediately after holding it. The whole operation behavior is inconvenient and not smooth from the user's perspective.

Further, the protection cover having a magnet switch is developed in the market and used for covering the screen 11 of the electronic device 1. When the protection cover is opened, a magnet switch in the electronic device 1 is triggered, and the electronic device 1 resumes from the hibernation mode. Thus, the action of pressing the keys 12 by the user 2 is waived. Nonetheless, in the using scenario mentioned above, the user cannot use the electronic device 1 right after holding the electronic device 1.

Accordingly, it is desired for people skilled in the art to optimize operation of resuming an electronic device from hibernation mode without extra trigger action so the electronic device is able to resume automatically based on user behaviors.

SUMMARY OF THE INVENTION

It is an objective of the present invention to provide an electronic device and method for resuming from hibernation. When the user wants to operate the electronic device, the electronic device resumes from the hibernation status without extra trigger actions required for triggering.

In order to accomplish the above objective, the external light of electronic device is detected via the light sensing component for attaining the light source data, the tilt angle of the electronic device against the horizontal plane is detected via the tilt sensing component for attaining the tilt data. Thus, when the light source data and the tilt data are determined to satisfy a predetermined resuming condition, the electronic device resumes from the hibernation status.

Compare to prior art, the present invention achieved the advantage that an electronic device detects its own status data via the light sensing component and the tilt sensing component for determining if a user wants to operate the electronic device. When it is determined that a user wants to operate the electronic device, the internal processing unit automatically enables the electronic device resuming from the hibernation status. Thus, when the user wants to operate the electronic device, no extra trigger actions required, for example pressing the power button or opening the protect cover having magnet switches for resuming the electronic device. Thus, the present invention effectively improves and optimizes the operation flow according to the user behaviors. The user only needs to pick up the electronic device from a bag, a pocket or from a desk, the electronic device is ready to operate directly, which is convenient and user friendly.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Embodiments are provided in the following in order to further detail the implementations of the present invention in the summary. It should be noted that objects used in the diagrams of the embodiments are provided with proportions, dimensions, deformations, displacements and details are examples and the present invention is not limited thereto and identical components in the embodiments are the given same component numbers.

Figure 1:
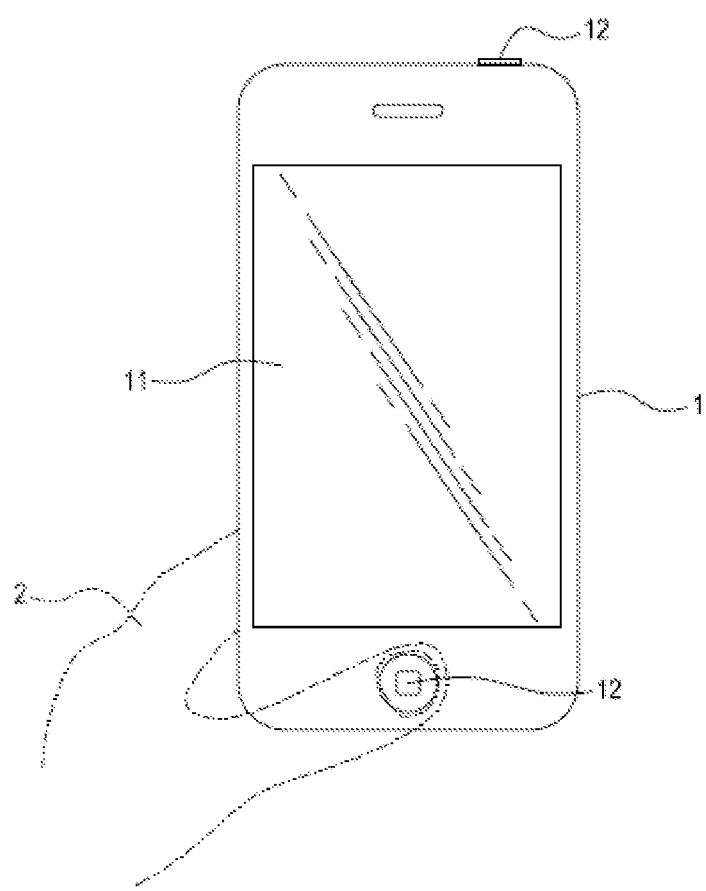
FIG. 1 is a schematic diagram of the electronic device hibernation status according to related art.
Figure 2:
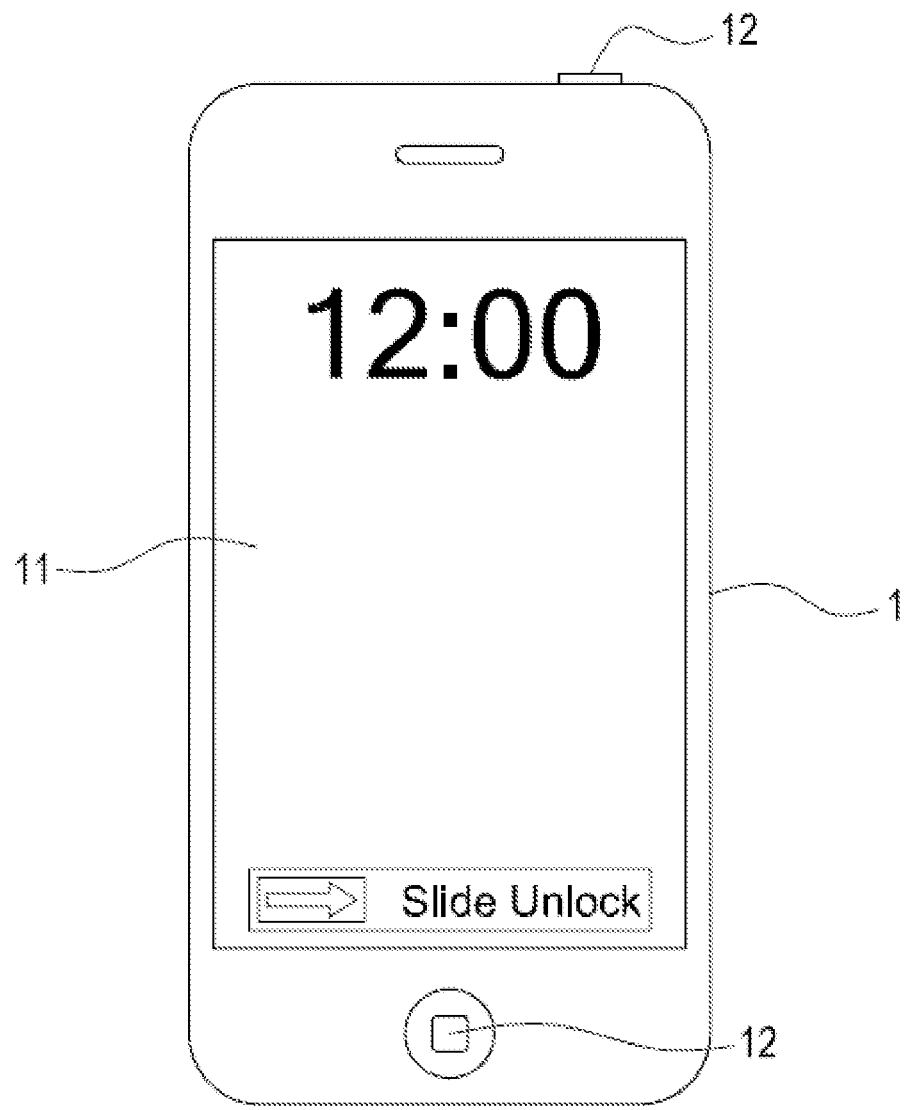
FIG. 2 is a schematic diagram of the electronic device resuming according to related art.
Figure 3:
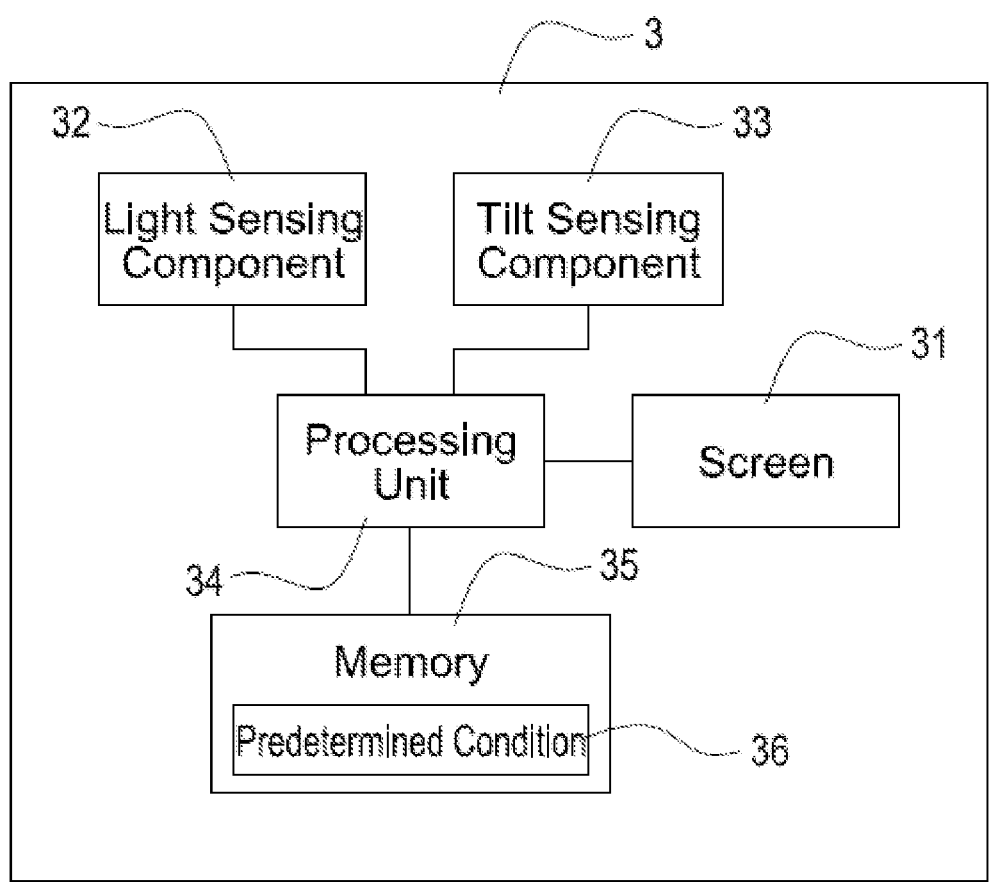
FIG. 3 is a block diagram of the electronic device of the first embodiment according to the present invention.
Figure 4:
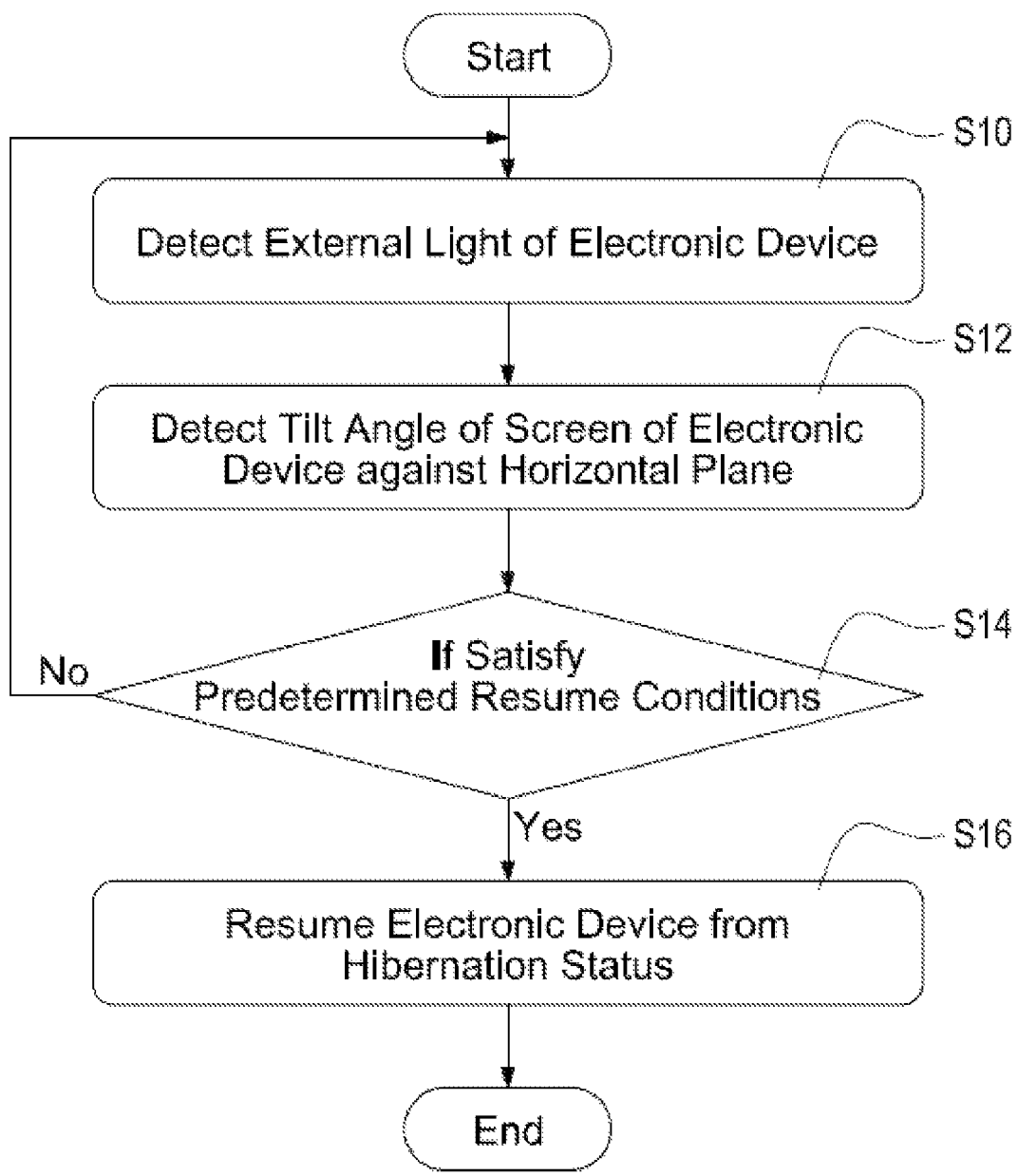
FIG. 4 is a resuming flowchart of the first embodiment according to the present invention.

FIG. 3 is a block diagram of the electronic device according to the first embodiment of the present invention and FIG. 4 is a resuming flowchart according to the first embodiment of the present invention. As shown in the FIG. 3, the present invention provides an electronic device 3, and the electronic device 3 has a screen 31, a light sensing component 32, a tilt sensing component 33, a processing unit 34 and a memory 35. The processing unit 34 is electrically coupled to the screen 31, the light sensing component 32, the tilt sensing component 33 and the memory 35. The electronic device 3 is set by the user or has a predetermined setting. Predetermined resuming conditions 36 are recorded in the memory 35.

The techniques applied by the present invention is that when the electronic device 3 is in a hibernation status (i.e., the screen 31 does not display any data, and does not provide the touch control function), the electronic device 3 automatically determines whether the electronic device 3 resumes from the hibernation status based on detecting results from the light sensing component 32 and the tilt sensing component 33. Thus, the user does not need to press the power button of the electronic device 3, or open the protect cover having magnet switches, and is allowed to directly use the electronic device 3.

As shown in FIG. 4, when the electronic device 3 is in the hibernation status, the external light of the electronic device 3 is detected via the light sensing component 32 (step S10), for attaining light source data according to the detecting results. At the same time, a tilt angle of the screen 31 of the electronic device 3 against the horizontal plane (the horizontal plane P shown in FIG. 6) is detected via the tilt sensing component 33 (step S12), for attaining tilt data according to the detecting results. Next, the processing unit 34 receives the light source data and the tilt data for determining if both the light source data and the tilt data satisfy the predetermined resuming conditions 36 (step S14). It should be noted that, at least a luminance condition and at least a tilt condition can be both set in the predetermined resuming conditions 36 set by the user and in the predetermined resuming conditions 36 in the electronic device 3. In other words, the predetermined resuming conditions 36 comprise at least a luminance condition and at least a tilt condition.

In the step S14, the processing unit 34 receives the light source data detected by the light sensing component 32, and determines if the light source data satisfies the luminance condition in the predetermined resuming conditions 36. At the same time, the processing unit 34 receives the tilt data detected by the tilt sensing component 33, and determines if the tilt data satisfies the tilt condition in the predetermined resuming conditions 36. In the embodiment, the electronic device 3 has to detect both the light source data and the tilt data. The detecting action of the light source data and the tilt data, and the determining action to decide if the light source data/the tilt data satisfy the luminance condition/the tilt condition are not restricted executing by a fixed sequence. For example, the electronic device 3 detects and generates the light source data, and first determines if the light source data satisfies the luminance condition in the predetermined resuming conditions 36. Or the electronic device 3 detects and generates the tilt data, and first determines if the tilt data satisfies the luminance condition in the predetermined resuming conditions 36. The execution order is subject to the filed requirements and is not limited thereto.

If at least one of the light source data and the tilt data does not satisfy the predetermined resuming conditions 36 (for example, the light source data does not satisfy the luminance condition in the predetermined resuming conditions 36, or the tilt data does not satisfy the tilt condition in the predetermined resuming conditions 36), then the processing unit 34 does not execute the resuming action of the electronic device 3. The flow returns to the step S10, where the electronic device 3 continues to detect and generate the light source data and the tilt data via the light sensing component 32 and the tilt sensing component 33, It should be noted that, the detecting action of the light sensing component 32 and the tilt sensing component 33 can be executed at the same time. As a result, the step S10 and the step S12 are not executed by a fixed sequence.

If the light source data and the tilt data simultaneously satisfy the predetermined resuming conditions 36 (i.e., the light source data satisfies the luminance condition, and the tilt data satisfies the tilt condition), then the processing unit 34 enables the electronic device 3 resuming from hibernation status (step S16). Thus, the user is conveniently allowed to directly operate the electronic device 3.

In the embodiment, the power source of the electronic device 3 is subject to change, accordingly the light sensing component 32, the tilt sensing component 33 and the processing unit 34 are able to work in the hibernation status of the electronic device 3. Thus, the status of the electronic device 3 is detected continually, and the time the electronic device 3 resuming from the hibernation status is further determined. According to experimental results, the additional current consumption to maintain operation of the light sensing component 32, the tilt sensing component 33 and the processing unit 34 in the hibernation status of the electronic device 3 is 200 μA, which do not pose substantial effect on the electronic device 3.

It should be noted that, in the embodiment, the light sensing component 32 and the tilt sensing component 33 are two physically separated components, or implemented with a single integrated circuit (IC), but is not limited thereto.

Figure 5:
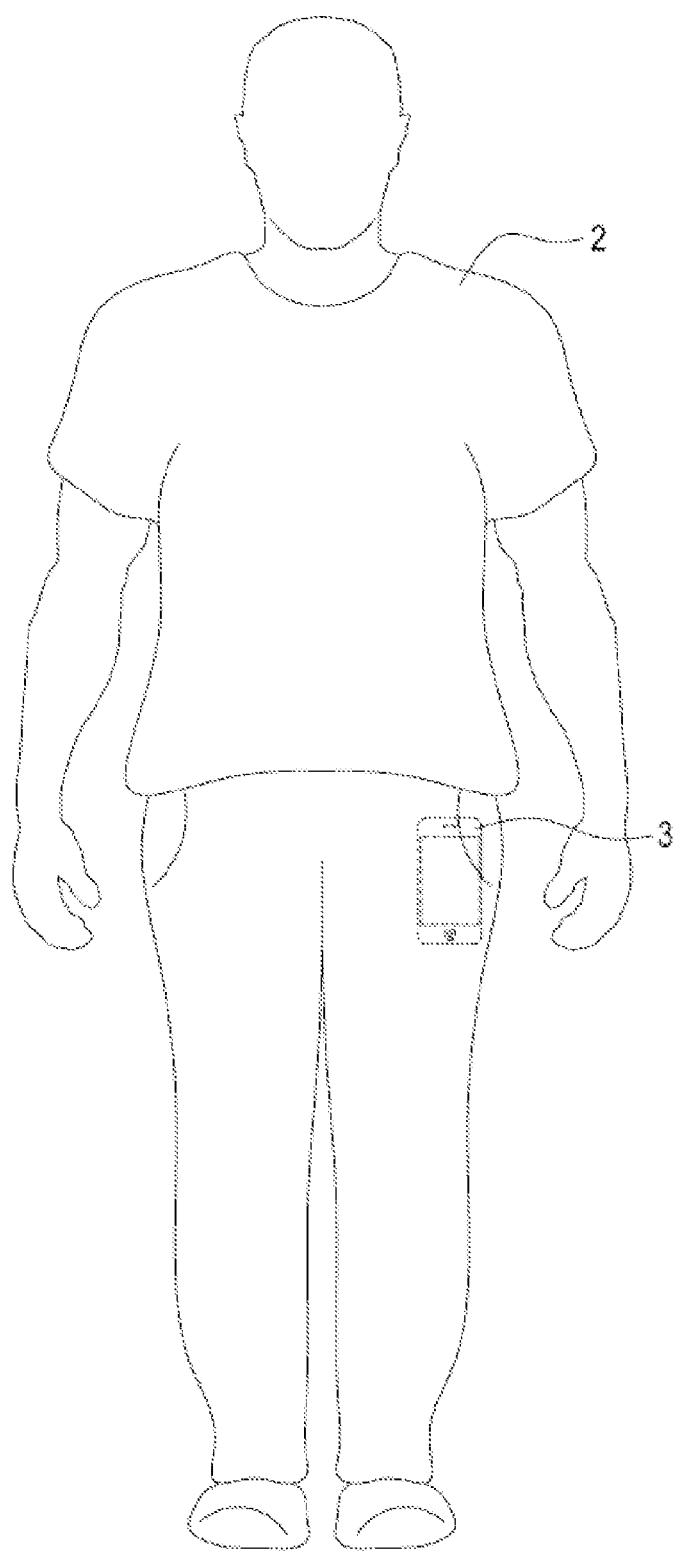
FIG. 5 is the first status schematic diagram according to the present invention.
Figure 6:
FIG. 6 is the second status schematic diagram according to the present invention.

FIG. 5 and FIG. 6 are respectively the first and the second status schematic diagrams according to the present invention. In the embodiment in the FIG. 5, when the user 2 puts the electronic device 3 in the pocket, the light sensing component 32 cannot detect the external light, and consequently the light source data attained does not satisfy the predetermined resuming conditions 36. In further details, the detected light source data does not satisfy the luminance condition in the predetermined resuming conditions 36 when the electronic device 3 is in the pocket of a user (in the dark). Thus, when the electronic device 3 is put in the pocket of the user 2, the electronic device 3 does not resume from the hibernation status.

It should be noted that, the light source data in the embodiment can be a luminance value or a luminance change value. If the light source data is a luminance value and when the electronic device 3 moves from a dark place to a bright place, the luminance value (for example value 6) detected by the light sensing component 32 is higher than a threshold value (for example value 5), the processing unit 34 determines that the light source data satisfies the luminance condition in the predetermined resuming conditions 36. In other words, the luminance condition in the predetermined resuming conditions 36 is that: the luminance value has to be higher than a threshold value. Further, if the light source data is a luminance change value and when the electronic device 3 moves from a dark place to a bright place, the luminance change value (for example the luminance value changes from 2 to 7, the luminance change value is 5) detected via the light sensing component 32 is higher than a threshold value (for example the threshold value of the luminance change value is 3), the processing unit 34 determines that the light source data satisfies the predetermined resuming conditions 36. In other words, the luminance condition in the predetermined resuming conditions 36 is that: the luminance change value has to be higher than a threshold value. Nonetheless, the above mentioned is a preferred embodiment of the present invention, and is not limited thereto.

As shown in FIG. 6, when the electronic device 3 is taken from the pocket by the user 2, the light sensing component 32 detects the external light, and the attained light source data (a luminance value or a luminance change value) satisfies the luminance condition in the predetermined resuming conditions 36. In the embodiment, the electronic device 3 detects a tilt angle of the screen 31 of the electronic device 3 against the horizontal plane P via the tilt sensing component 33. In further details, the processing unit 34 next determines if the detected tilt angle satisfies the tilt condition in the predetermined resuming conditions 36, namely, whether the electronic device 3 is held by the user 2 and is in an operation status (for example the operating status shown in FIG. 6).

For example, when the electronic device 3 is placed on a desk and the light sensing component 32 detects a certain level of the external light, the light source data may satisfy the predetermined resuming conditions 36. Yet, the electronic device 3 is parallel with the desk surface (which equals to the horizontal plane P). Accordingly, the tilt data does not satisfy the predetermined resuming conditions 36. In further details, the tilt data does not satisfy the tilt condition in the predetermined resuming conditions 36. At this point, though the light source data satisfies the luminance condition in the predetermined resuming conditions 36, the electronic device 3 does not resume from the hibernation status.

The method and device of the present invention detect both light source data and the tilt data of the electronic device 3, and determine if both the light source data and the tilt data satisfy the predetermined resuming conditions 36, as well as determine if the electronic device 3 needs to resume from the hibernation status (namely, determine whether the electronic device 3 is held by the user 2, and in an operating status). The method of the present invention is convenient, and requires both detecting and determining two different data. Consequently the electronic device 3 is prohibited from unnecessary resuming, thus saving electric power.

In an embodiment, the tilt sensing component 33 is a gyro. The electronic device 3 directly measures the tilt angle of the screen 31 against the horizontal plane P via the gyro, for attaining the tilt data. Thus, the processing unit 34 determines if the tilt data satisfies the predetermined resuming conditions 36 accordingly. In further details, when the tilt data satisfies the predetermined resuming conditions 36, this means that the electronic device 3 is held by the user 2 and manifests that the electronic device 3 is in an operating status (as shown in FIG. 6). In the other embodiment, the tilt sensing component 33 is a G-sensor. The G-sensor mainly detects normal vector of the plane of the screen 31 on the electronic device 3, and the tilt angle against the horizontal plane P is determined via the normal vector of the plane of the screen 31.

Figure 7:
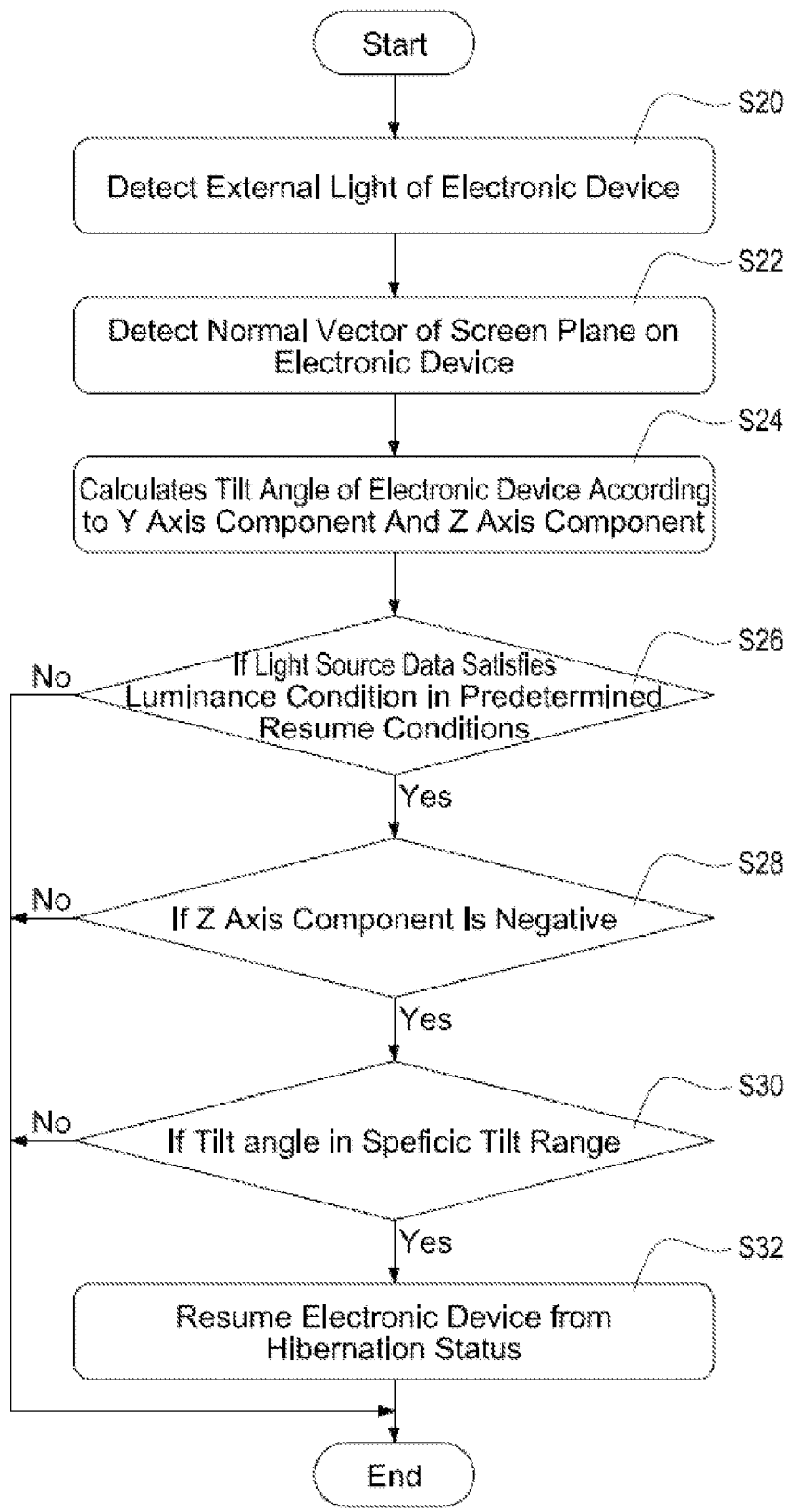
FIG. 7 is a resuming flowchart of the second embodiment according to the present invention.

FIG. 7 is a resuming flowchart according to the second embodiment of the present invention. In the embodiment, a G-sensor is used as an example of the tilt sensing component 33, the sensing mechanism of the G-sensor is different from that of a gyro (detailed in the following).

As shown in the FIG. 7, when the electronic device 3 is in the hibernation status, the external light of the electronic device 3 is detected via the light sensing component 32 (step S20), for attaining the above mentioned light source data according to the detected results. Next, the normal vector of the plane of the screen 31 on the electronic device 3 is detected via the tilt sensing component 33 (the G-sensor in the embodiment) (step S22). The normal vector comprises an x axis component, a y axis component and a z axis component.

Figure 8:
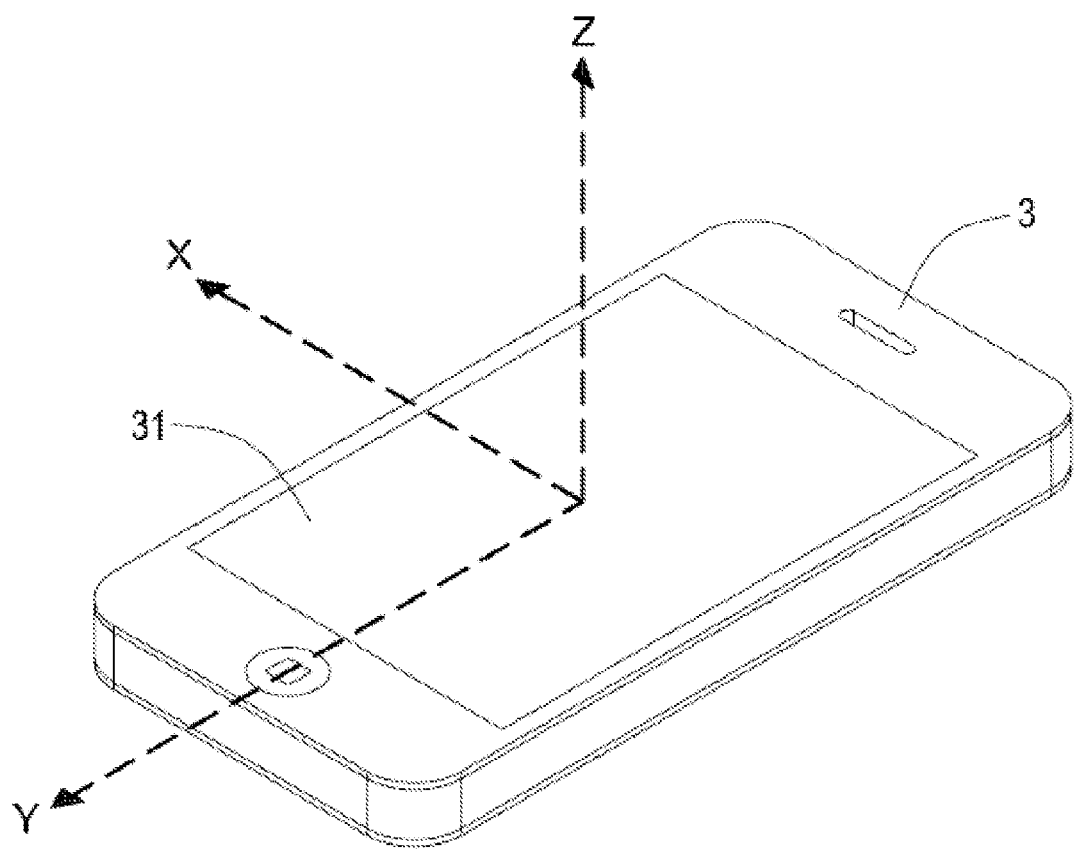
FIG. 8 is a normal vector schematic diagram of the first embodiment according to the present invention.
Figure 9:
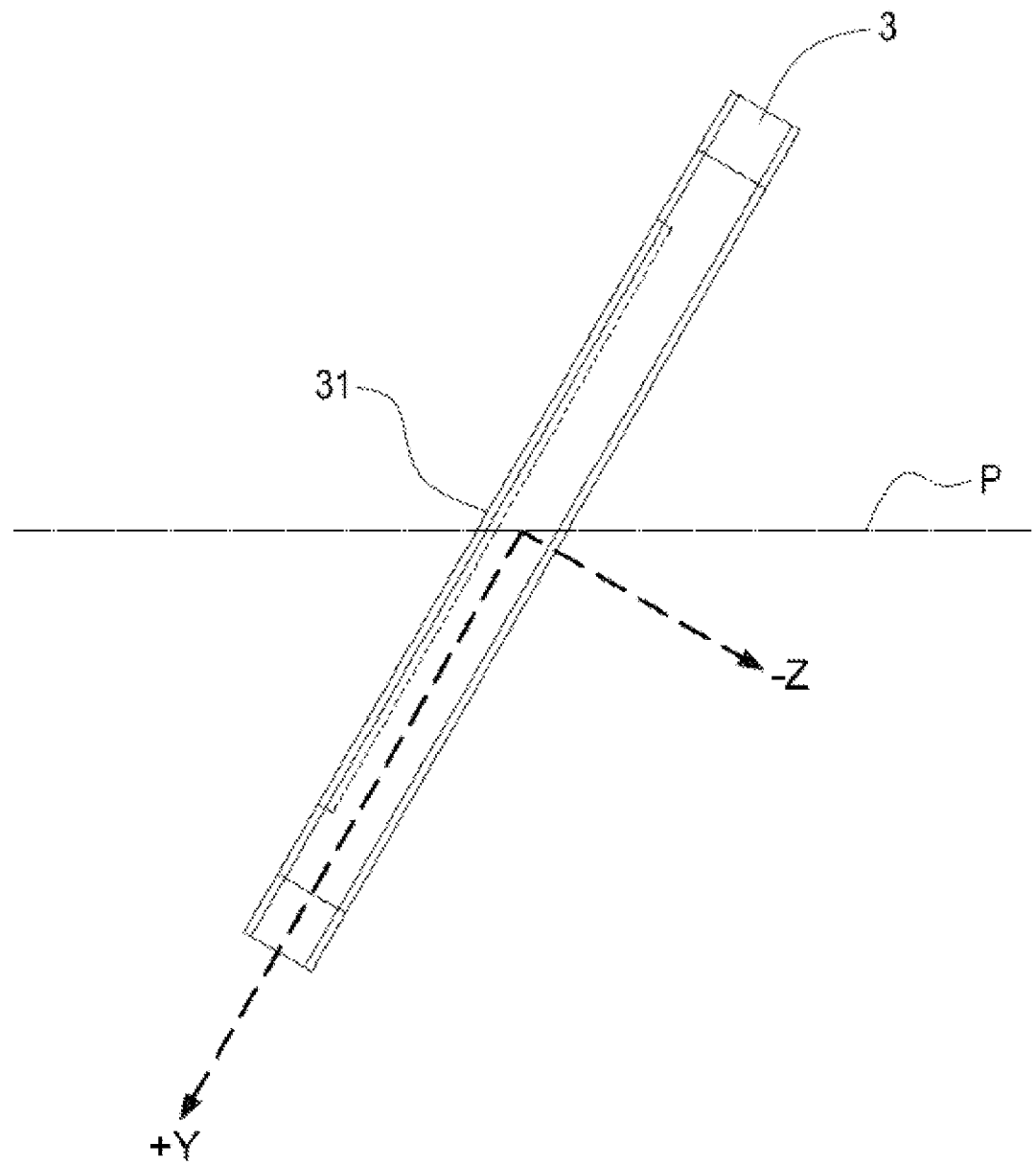
FIG. 9 is a normal vector schematic diagram of the second embodiment according to the present invention.

FIG. 8 and FIG. 9 are respectively normal vector schematic diagrams according to the first and the second embodiment of the present invention. As shown in the diagram, the above mentioned normal vector comprises an x axis component, a y axis component and a z axis component. When the electronic device 3 is placed horizontally (and parallel with horizontal plane P), the z axis component is perpendicular to the screen 31 of the electronic device 3. In the embodiment, when the screen 31 of the electronic device 3 faces up (facing the z axis), the z axis component of the electronic device 3 is negative. On the other hand, the z axis component of the electronic device 3 is positive when the screen of the electronic device 3 faces down (facing the negative z axis). The above description is an embodiment of the present invention, and is not limited thereof.

Back to FIG. 7, after the tilt sensing component 33 attains the normal vector in the step S22, the processing unit 34 calculates the tilt angle of the screen 31 of the electronic device 3 against the horizontal plane P according to the y axis component and the z axis component of the normal vector (step S24).

Next, the processing unit 34 determines if the light source data satisfies the luminance condition in the predetermined resuming conditions 36 (step S26), if the light source data does not satisfy the luminance condition in the predetermined resuming conditions 36, the processing unit 34 does not perform operations. On the other hand, the processing unit 34 proceeds to other determining operations if the light source data satisfies the luminance condition in the predetermined resuming conditions 36.

For example, when the user 2 operates the electronic device 3, the screen 31 of the electronic device 3 ordinarily faces up (as shown in FIG. 6 and FIG. 9). As mentioned above, when the screen 31 faces up, the z axis component of the electronic device 3 is negative. Thus, after the step S24, the processing unit 34 further determines if the z axis component of the electronic device 3 is negative (step S28). The condition setting of the z axis component being negative can be set by user, or predetermined in the electronic device 3, and is not limited thereto.

In the embodiment, if the z axis component is positive, the screen 31 does not face up (this means that the electronic device 3 is not held by the user 2 or not in an operating status). According to the setting in the electronic device 3, the processing unit 34 determines the tilt data does not satisfy the predetermined resuming conditions 36. In further details, when the z axis component is detected positive, the processing unit 34 determines the tilt data does not satisfy the tilt condition in the predetermined resuming conditions 36, and does not perform other determining operations. In other words, the tilt condition in the predetermined resuming conditions 36 is: the z axis component is negative.

If in the step S28, the z axis component is determined negative, the screen 31 is determined to face up (this means that the electronic device 3 is held by the user 2, and in an operating status). The processing unit 34 determines the z axis component is negative (this means the tilt condition is satisfied) and further determines if the tilt angle is in a specific tilt range in the predetermined resuming conditions 36 (specific tilt range 361 shown in FIG. 10) (step S30). If the tilt angle (for example 20 degrees) is not in the specific tilt range 361 (for example 30~80 degrees), the processing unit 34 determines that the tilt data does not satisfy the predetermined resuming conditions and does not perform any determining operation according to the setting of the electronic device 3. In other words, the other tilt condition in the predetermined resuming conditions 36 is: the tilt angle is in the specific tilt range 361.

When the processing unit 34 determines that the light source data satisfies the luminance condition in the predetermined resuming conditions, and the z axis component is negative as well as, at the same time, the tilt angle is in the specific tilt range 361 (the tilt data satisfies the tilt condition in the predetermined resuming conditions 36), the electronic device 3 resumes from the hibernation status (step S32).

In FIG. 7, even if the z axis component is negative and the tilt angle is in the specific tilt range 361 (which means, the tilt data both satisfies the two tilt conditions in the predetermined resuming conditions 36), as long as the light source data does not satisfy the luminance condition in the predetermined resuming conditions 36, the processing unit 34 does not enable the electronic device 3 resuming from the hibernation status, and vice versa. It should be noted that, the determining operation of the above mentioned steps S26-S30 are not required to execute by a fixed sequence and is not limited to the above fixed sequence.

Figure 10:
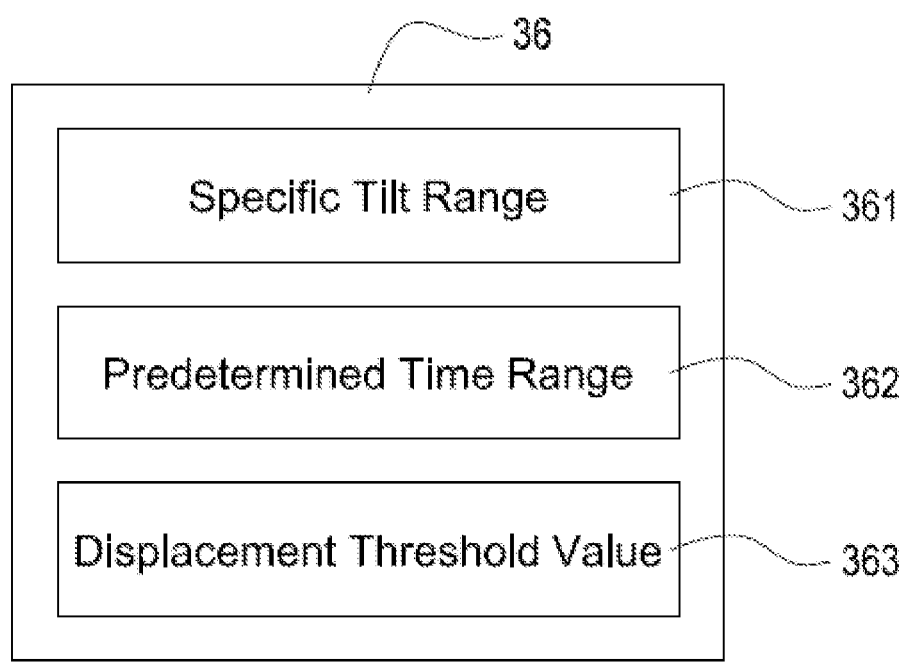
FIG. 10 is a schematic diagram of the predetermined resuming conditions of the first embodiment according to the present invention.

FIG. 10 is a schematic diagram of the predetermined resuming conditions according to the first embodiment of the present invention. In the embodiment, the predetermined resuming conditions 36 are set by the user 2, or are predetermined. For example, in FIG. 10, the predetermined resuming conditions 36 comprises the above specific tilt range 361, and also comprises a predetermined time range 362 as well as a displacement threshold value 363 (detailed in the following). Thus, the processing unit 34 is allowed to determine if the electronic device 3 resumes according to the light source data and the tilt data, further the processing unit 34 can determine if the electronic device 3 resumes from the hibernation status according to the operated time of the electronic device 3 by the user 2, and the displacement value of the electronic device 3.

As mentioned above, under the normal operating status, the screen 31 of the electronic device 3 faces up (the z axis component is negative). Nonetheless, under the special circumstances, it is allowed to enable the electronic device 3 resuming from the hibernation status when the screen 31 of the electronic device 3 faces down (the z axis component is positive), so that the user 2 can operate. For example, during the typical sleep time period (for example PM 12:00~AM 7:00), it is possible that the user 2 uses the electronic device 3 when lying down. Under the circumstance, the electronic device 3 is operated with the screen 31 facing down by the user 2.

Figure 11:
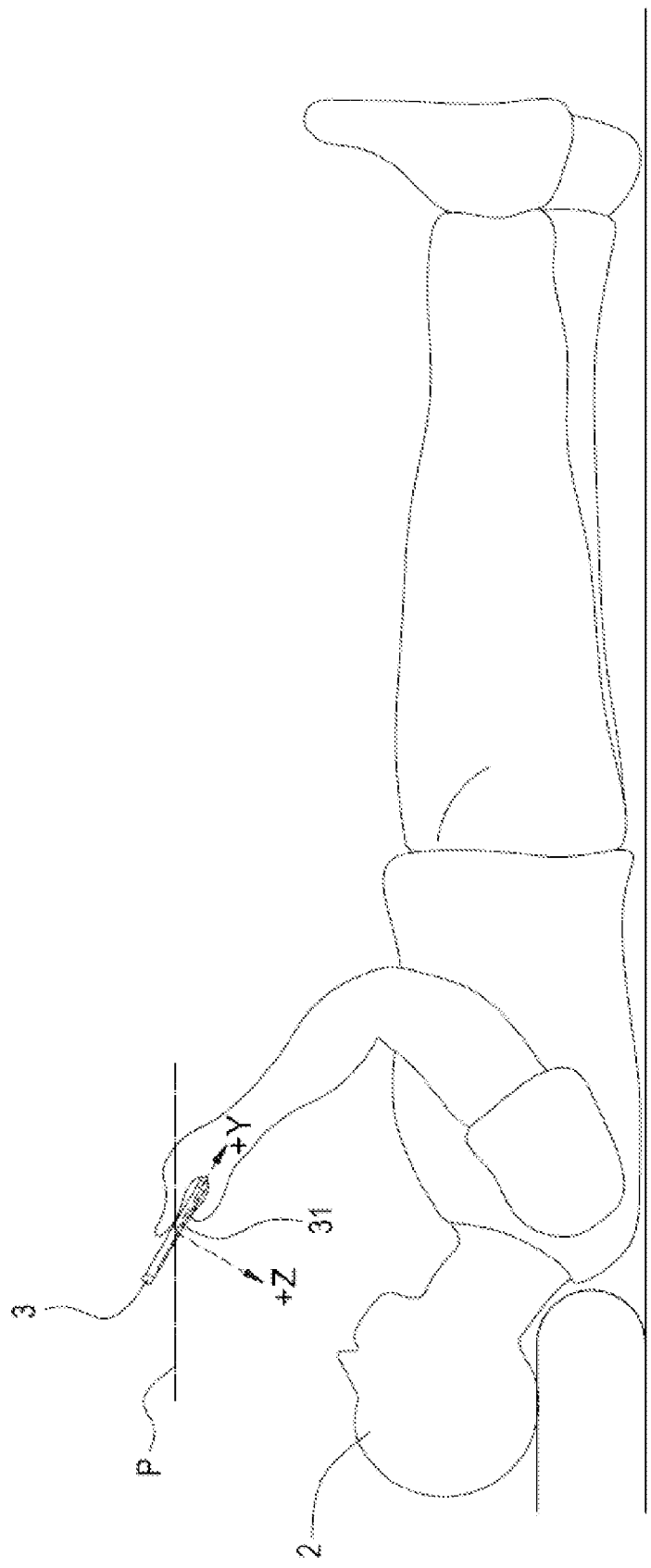
FIG. 11 is the third status schematic diagram according to the present invention.
Figure 12:
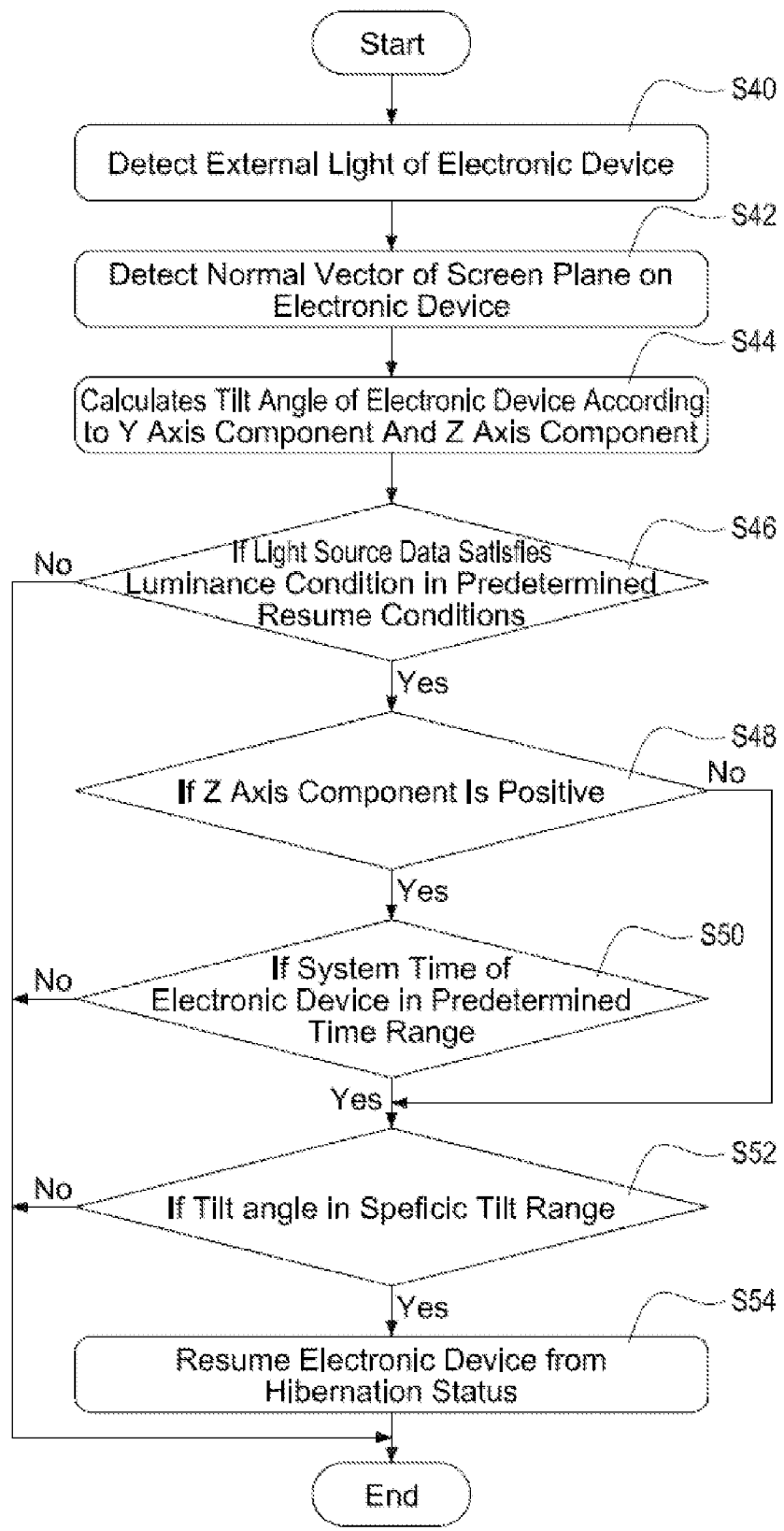
FIG. 12 is a resuming flowchart of the third embodiment according to the present invention.

Refer to FIG. 11 and FIG. 12, FIG. 11 is the third status schematic diagram according to the present invention, and FIG. 12 is a resuming flowchart according to the third embodiment of the present invention. As shown in FIG. 11, when the electronic device 3 is held by the user 2 with the screen 31 facing down, the processing unit 34 determines that the z axis component of the electronic device 3 is positive. Accordingly, the processing unit 34 has to make determination based on the embodiment shown in FIG. 12 such that the user 2 is allowed to normally operate the electronic device 3 under the circumstance.

As shown in FIG. 12, when the electronic device 3 is in the hibernation status, the external light of the electronic device 3 is detected by the light sensing component 32 (step S40), for attaining the above mentioned light source data according to the detected results. Next, the normal vector of the plane of the screen 31 on the electronic device 3 is detected by the tilt sensing component 33 (i.e. G-sensor) (step S42). Thus, the tilt angle of the screen 31 of the electronic device 3 against the horizontal plane P is calculated according to the y axis component and the z axis component of the normal vector (step S44).

Next, the processing unit 34 determines if the light source data satisfies the luminance condition in the predetermined resuming conditions 36 (step S46), if the light source data does not satisfy the luminance condition in the predetermined resuming conditions 36, the processing unit 34 does not perform any operation. On the other hand, if the light source data satisfies the luminance condition in the predetermined resuming conditions 36, the processing unit 34 continues to perform other determining operations. For example, in the embodiment, the processing unit 34 further determines if the z axis component is positive (step S48), which means that the processing unit 34 further determines if the screen 31 of the electronic device 3 faces down in reality.

If in the step S48 the z axis component is determined positive, the processing unit 34 moves to other determining operation steps. For example, if the user 2 sets the above predetermined time range 362, the processing unit 34 moves to determine if the system time of the electronic device 3 is in the predetermined time range 362 (for example PM 12:00~AM 7:00) (step S50). As mentioned above, if the system time of the electronic device 3 is not in the predetermined time range 362 and the z axis component is positive, the processing unit 34 determines that the tilt data does not satisfy the tilt condition in the predetermined resuming conditions 36 (i.e., the z axis component has to be negative), and the processing unit 34 does not perform any operation.

Nonetheless, if the user 2 sets the above mentioned predetermined time range 362, and the system time of the electronic device 3 is in the predetermined time range 362, the processing unit 34 further determines if tilt angle of the electronic device 3 is in the specific tilt range 361 (step S52). The other determining operation does not stop because the z axis component is positive. In other words, the predetermined resuming conditions 36 comprise another tilt condition: when the system time is in the predetermined time range 362, the z axis component can be positive.

If in the step S52, the processing unit 34 determines that the tilt angle of the electronic device 3 is not in the specific tilt range 361, the processing unit 34 determines that the tilt data does not satisfy the tilt condition in the predetermined resuming conditions 36 (i.e., the tilt angle has to be in the specific tilt range 361). If the tilt angle of the electronic device 3 is in the specific tilt range 361, the processing unit 34 determines that the tilt data satisfies the tilt condition in the predetermined resuming conditions 36. Under the circumstance, if the light source data satisfies the luminance condition in the predetermined resuming conditions 36, also the z axis component is positive, the system time of the electronic device 3 is in the predetermined time range 362, the tilt angle is in the specific tilt range 361 (the tilt data satisfies the tilt condition in the predetermined resuming conditions 36 in reality), the electronic device 3 resumes from the hibernation status (step S54). It should be noted that, the above mentioned determining step S26-S30 are not required to execute by a fixed sequence and is not limited thereto.

In further details, in the above mentioned embodiment, if the z axis component of the electronic device 3 is positive, three conditions are satisfied: the system time of the electronic device 3 has to be in the predetermined time range 362, the tilt angle is in the specific tilt range 361, and the light source data satisfies the luminance condition in the predetermined resuming conditions 36, then the electronic device 3 resumes from the hibernation status. In other words, if the z axis component of the electronic device 3 is negative, as shown in the embodiment in FIG. 7, even if the system time of the electronic device 3 is not in the predetermined time range 362 (or the user 2 does not set the predetermined time range 362), as long as two conditions are satisfied: the tilt angle is in the specific tilt range 361, and the light source data satisfies the luminance condition the predetermined resuming conditions 36, the processing unit 34 enables the electronic device 3 resuming from the hibernation status.

Figure 13:
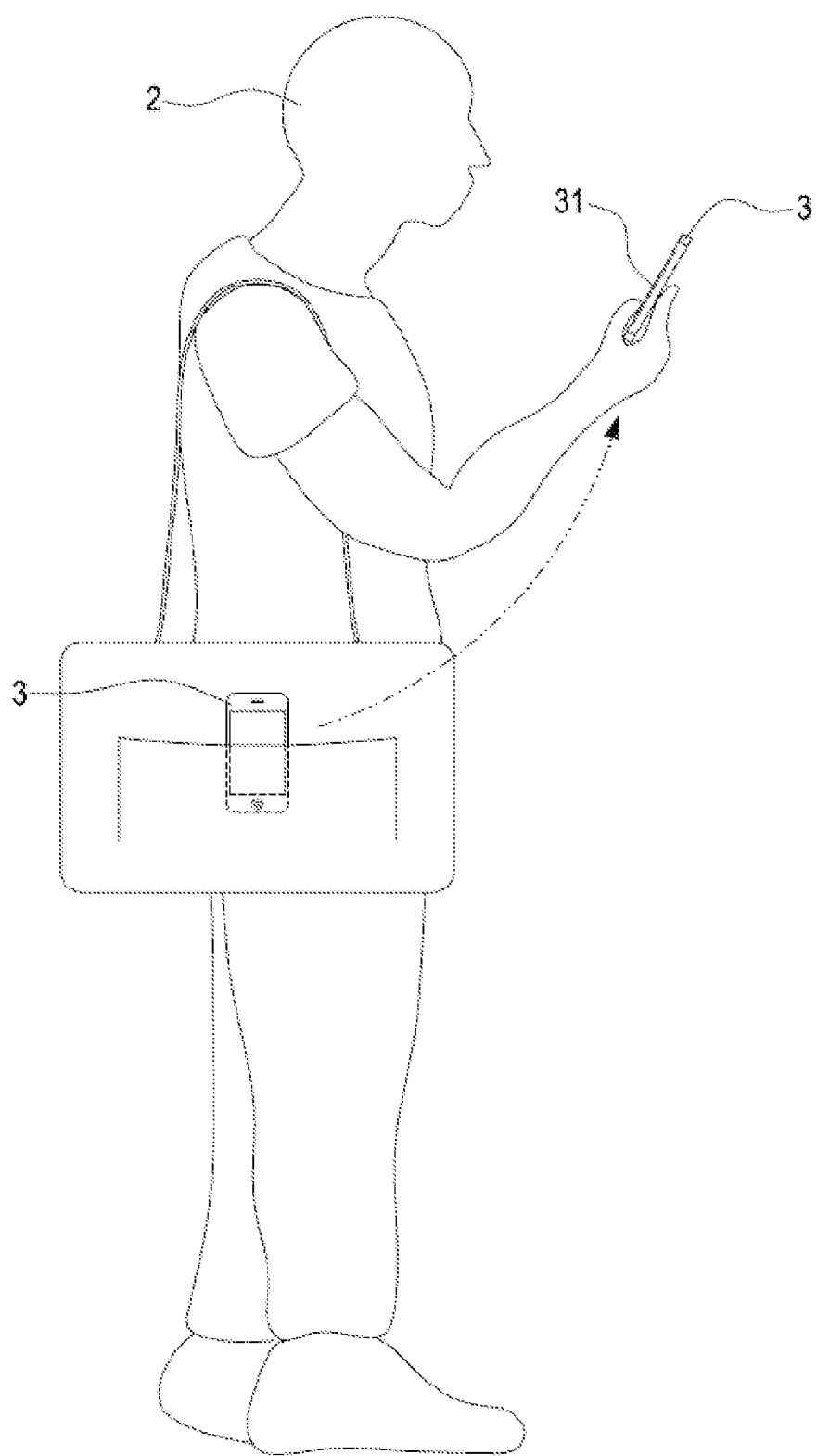
FIG. 13 is an usage schematic diagram of the fourth embodiment according to the present invention.

FIG. 13 is a usage schematic diagram of the fourth embodiment according to the present invention. As shown in FIG. 13, if the electronic device 3 is not in use and placed in a bag, the electronic device is in the hibernation status. At this point, if the user 2 wants to use the electronic device 3, an instant displacement value of the electronic device 3 is generated as the user 2 takes the electronic device 3 from the bag. In the embodiment, the processing unit 34 also uses the displacement value as a determining parameter.

Figure 14:
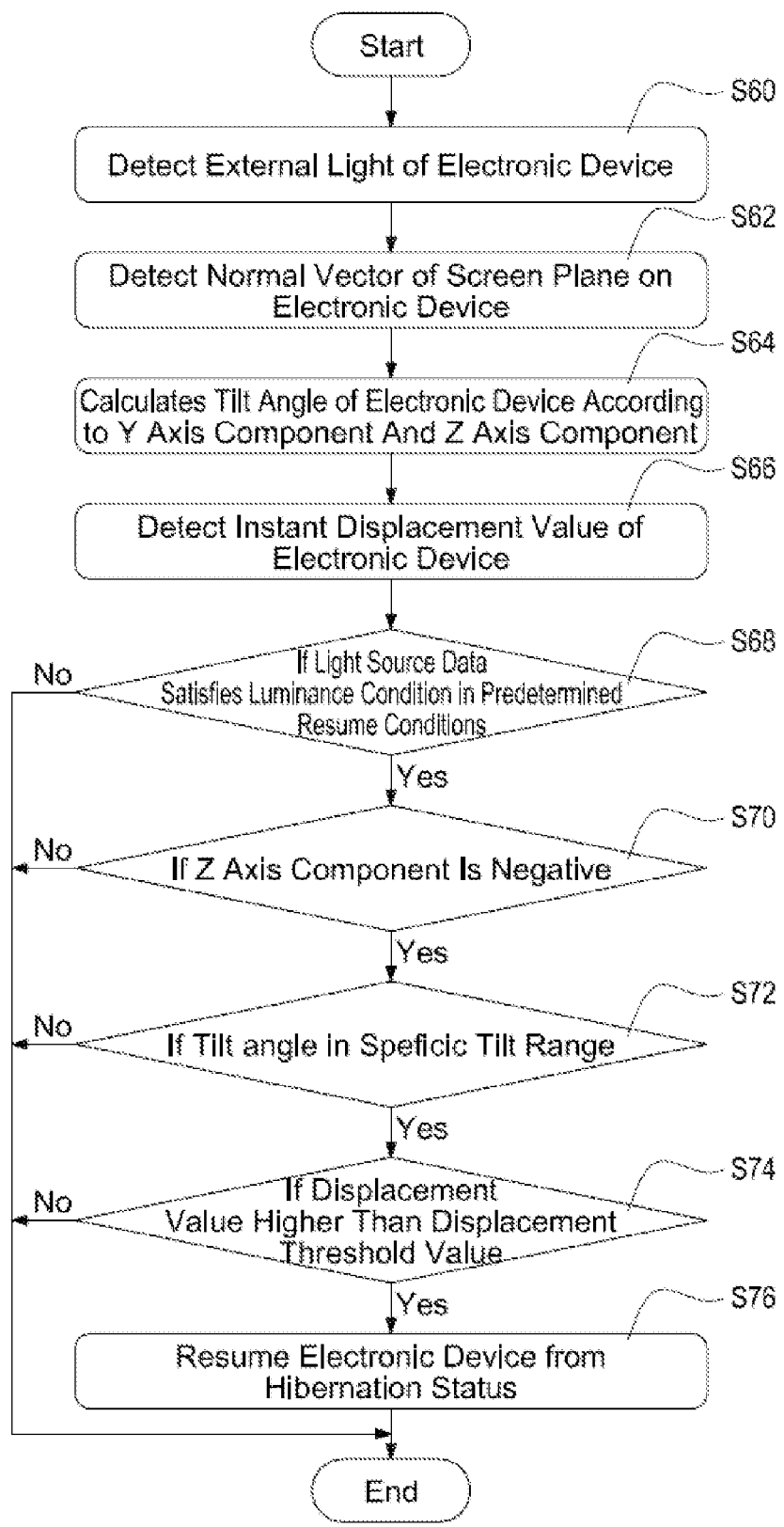
FIG. 14 is a resuming flowchart of the fourth embodiment according to the present invention.

FIG. 14 is a resuming flowchart of the fourth embodiment according to the present invention. When the electronic device 3 is in the hibernation status, the external light of the electronic device 3 is detected by the light sensing component 32 (step S60), for attaining the light source data according to the detected results. Next, the normal vector of the plane of the screen 31 on the electronic device 3 is detected by the tilt sensing component 33 (i.e. G-sensor) (step S62). Thus, the tilt angle of the screen 31 of the electronic device 3 against the horizontal plane P is calculated according to the y axis component and the z axis component of the normal vector (step S64).

Next, the electronic device 3 also detects an instant displacement value of the electronic device 3 via the tilt sensing component 33 (i.e. G-sensor) (step S66), for attaining the displacement data.

Next, the processing unit 34 determines if the light source data satisfies the luminance condition in the predetermined resuming conditions 36 (step S68). If the light source data does not satisfy the luminance condition in the predetermined resuming conditions 36, the processing unit 34 does not perform any determining operation further. On the other hand, if the light source data satisfy the luminance condition in the predetermined resuming conditions 36, the processing unit 34 continues to perform other determining operations. For example, the processing unit 34 further determines if the z axis component is negative (step S70), depending on whether the screen 31 of the electronic device 3 faces up. If the z axis component is positive, the screen 31 does not face up (the electronic device 3 is not held by the user 2 or not in an operating status in reality). The processing unit 34 determines that the tilt data does not satisfy the tilt condition in the predetermined resuming conditions 36, or further determining if the system time of the electronic device 3 is in the predetermined time range 362 according to the embodiment in the FIG. 12.

If determining the z axis component is negative, the screen 31 faces up (the electronic device 3 is held by the user 2, and in an operating status), when the processing unit 34 further determines if the tilt angle is in the specific tilt range 361 (step S72). If the tilt angle is not in the specific tilt range 361, the processing unit 34 determines that the tilt data does not satisfy the predetermined resuming conditions, and does not perform any determining operation. If the tilt angle is determined to be in the specific tilt range 361, in the embodiment, the processing unit 34 further determines if the displacement data is higher than the displacement threshold value 363 in the predetermined resuming conditions 36 (step S74). If the displacement data is not higher than the displacement threshold value 363, the processing unit 34 determines that the tilt data does not satisfy the tilt condition in the predetermined resuming conditions 36. On the other hand, if the displacement data is higher than the displacement threshold value 363, the processing unit 34 determines that the tilt data satisfy the tilt condition in the predetermined resuming conditions 36. In other words, the predetermined resuming conditions 36 comprise another tilt condition: the displacement data is higher than the displacement threshold value 363.

In the embodiment in the FIG. 14, when four conditions are satisfied: the light source data satisfies the luminance condition in the predetermined resuming conditions 36, the z axis value is negative (or the z axis component is positive, and the system time of the electronic device 3 is in the predetermined time 362), the tilt angle is in the specific tilt range 361 and the displacement data is higher than the displacement threshold value 363, the processing unit 36 enables the electronic device 3 resuming from the hibernation status (step S76).

In further details, in the embodiment, when only three conditions are satisfied: z axis value of the electronic device 3 is negative (or the z axis component is positive, and the system time of the electronic device 3 is in the predetermined time 362), the tilt angle is in the specific tilt range 361, and the displacement data is higher than the displacement threshold value 363, the processing unit 34 then moves to determine that the tilt data satisfy the tilt condition in the predetermined resuming conditions 36. In other words, even if the z axis value of the electronic device 3 is negative (or the z axis component is positive, and the system time of the electronic device 3 is in the predetermined time 362), the tilt angle in the specific tilt range 361, and the light source data satisfies the luminance condition in the predetermined resuming conditions 36, as long as the displacement data is lower than the displacement threshold value 363, the processing unit 34 does not resume the electronic device 3.

Nonetheless, in the embodiments in FIG. 7, FIG. 12 and FIG. 14, determining steps of the processing unit 36 are not required to execute by a fixed sequence. For example, the processing unit 36 first determines if the light source data satisfies the luminance condition in the predetermined resuming conditions 36, then determines if the tilt data satisfies the tilt condition in the predetermined resuming conditions 36. On the other hand, the processing unit 36 first determines if the tilt data satisfies the tilt condition in the predetermined resuming conditions 36, then determines if the light source data satisfies the luminance condition in the predetermined resuming conditions 36.

For another example, the processing unit 36 first determines if the tilt angle is in the specific tilt range 361, and then determines if the displacement data higher than the displacement threshold value 363. On the other hand, the processing unit 36 first determines if the displacement data is higher than the displacement threshold value 363, then determines if the tilt angle is in the specific tilt range 361. The above mentioned descriptions are preferred embodiments of the present invention; the practical determining order is subject to practical requirements and is not limited to the above embodiments.

As the skilled person will appreciate, various changes and modifications can be made to the described embodiments. It is intended to include all such variations, modifications and equivalents which fall within the scope of the invention, as defined in the accompanying claims.

What is claimed is:

1. A method for resuming an electronic device from hibernation, the electronic device comprising a light sensing component and a tilt sensing component, and recorded with a predetermined resuming condition, the method comprising:
when the electronic device is in a hibernation status, performing the steps of:
a) detecting external light of the electronic device via the light sensing component for attaining light source data;
b) detecting the tilt angle of the electronic device against the horizontal plane via the tilt sensing component for attaining tilt data, wherein the tilt sensing component is a G-sensor, the step b further comprising:
b1) the G-sensor detecting a normal vector of the screen plane of the electronic device, wherein the normal vector comprises x axis component, y axis component and z axis component; and
b2) calculating a tilt angle of the screen plane of the electronic device against the horizontal plane according to the y axis component and the z axis component of the normal vector for attaining the tilt data;
c) determining if the light source data and the tilt data satisfy the predetermined resuming condition; and
d) detecting an instant displacement value of the electronic device via the G-sensor for attaining displacement data; and
further comprising the step of:
e) wherein the predetermined resuming condition further comprises a displacement threshold value, and when the light source data and the tilt data satisfy the predetermined resuming condition, and the displacement data is higher than the displacement threshold value, the electronic device resumes from the hibernation status.

2. The method of claim 1, wherein the light sensing component and the tilt sensing component are integrated circuits (ICs).

3. The method of claim 1, wherein the tilt sensing component is a gyro, in the step b, a tilt angle of the screen plane of the electronic device against the horizontal plane is detected via the gyro for attaining the tilt data.

4. The method of claim 1, wherein the predetermined resuming condition comprises a negative specific tilt range and negative z axis component, the step c further comprises determining if the z axis component of the tilt data is negative, and if the tilt angle is in the specific tilt range.

5. The method of claim 1, wherein the predetermined resuming condition comprises a predetermined time range;
wherein, the step c further comprising determining if the system time of the electronic device is in the predetermined time range, the predetermined time range comprising a period of time of day between a starting time and an ending time;
wherein, in the step e, when the light source data and the tilt data satisfy the predetermined resuming condition, and the system time of the electronic device is in the predetermined time range, the electronic device resumes from the hibernation status.

6. The method of claim 5, wherein the predetermined resuming condition comprises a positive specific tilt range and positive z axis component, the step c further comprises determining if the z axis component of the tilt data is positive, and if the tilt angle is in the specific tilt range.

7. The method of claim 1, wherein the light source data is a luminance value.

8. The method of claim 1, wherein the light source data is a luminance change value.

9. An electronic device, comprising:
a light sensing component used for detecting external light of the electronic device via the light sensing component for attaining light source data;
a tilt sensing component detecting the tilt angle of the electronic device against the horizontal plane via the tilt sensing component for attaining tilt data; and
a processing unit electrically coupled to the light sensing component and the tilt sensing component, used for receiving the light source data and the tilt data;
wherein the electronic device resumes from a hibernation status when the electronic device is in the hibernation status and the processing unit determines that both the light source data and the tilt data satisfy a predetermined resuming condition;
wherein the tilt sensing component is a G-sensor, the electronic device has a screen, the G-sensor detects a normal vector of the screen plane of the electronic device, the processing unit calculates a tilt angle of the screen plane against the horizontal plane according to the y axis component and the z axis component of the normal vector for attaining the tilt data; and
wherein the predetermined resuming condition further comprises a displacement threshold value, and the G-sensor further detects an instant displacement value of the electronic device for attaining displacement data, wherein the processing unit enables the electronic device to resume from the hibernation status when the light source data and the tilt data satisfy the predetermined resuming condition, and the displacement data is higher than the displacement threshold value.

10. The electronic device of claim 9, wherein the light sensing component and the tilt sensing component are integrated circuits.

11. The electronic device of claim 9, wherein the tilt sensing component is a gyro, in the step b, a tilt angle of the screen plane of the electronic device against the horizontal plane is detected via the gyro for attaining the tilt data.

12. The electronic device of claim 9, wherein the predetermined resuming condition comprises a negative specific tilt range and negative z axis component, and the processing unit determines the tilt data satisfies the predetermined resuming condition when the z axis component of the tilt data is negative and the tilt angle is in the specific tilt range.

13. The electronic device of claim 9, wherein the predetermined resuming condition further comprises a predetermined time range and the processing unit enables the electronic device resuming from the hibernation status when both the light source data and the tilt data satisfy the predetermined resuming condition, and the system time of the electronic device is in the predetermined time range, wherein the predetermined time range comprises a period of time of day between a starting time and an ending time.

14. The electronic device of claim 13, wherein the predetermined resuming condition further comprises a positive specific tilt range and positive z axis component, the processing unit determines the tilt data satisfy the predetermined resuming condition when the z axis component of the tilt data is positive and the tilt angle is in the specific tilt range.

15. The method for resuming from hibernation of claim 1, wherein the light source data is a luminance value or a luminance change value.

* * * * *